United States Patent [19]

Oki et al.

[11] Patent Number: 4,686,708
[45] Date of Patent: Aug. 11, 1987

[54] ANTENNA CIRCUIT

[75] Inventors: Ryuji Oki, Tokyo; Tadashi Sakai, Kanagawa, both of Japan

[73] Assignee: Sony Corporation, Tokyo, Japan

[21] Appl. No.: 813,836

[22] Filed: Dec. 27, 1985

[30] Foreign Application Priority Data

Jan. 8, 1985 [JP] Japan .................................. 60-1347

[51] Int. Cl.[4] ............................................. H04B 1/18
[52] U.S. Cl. ................................... 455/280; 455/193; 455/274
[58] Field of Search ............... 455/280, 129, 193, 269, 455/274, 323, 333; 343/850

[56] References Cited

U.S. PATENT DOCUMENTS 2,203,487  6/1940  Burgholz ........................... 455/280
2,619,588  11/1952  Nowak ............................. 455/280
3,018,373  1/1962  Nygaard ........................... 343/850

FOREIGN PATENT DOCUMENTS

WO80/2782  12/1980  PCT Int'l Appl. .

Primary Examiner—Robert L. Griffin
Assistant Examiner—Elissa Seidenglanz
Attorney, Agent, or Firm—Lewis H. Eslinger; Alvin Sinderbrand

[57] ABSTRACT

An antenna circuit includes a ferrite core around which a main coil and a negative feedback coil are wound, and a field effect transistor (FET) with its source grounded, and with a voltage induced in the main coil being applied across the gate and the source of the FET to thereby form an aperiodic circuit and the drain of the FET being connected through the negative feedback coil to a load.

6 Claims, 8 Drawing Figures

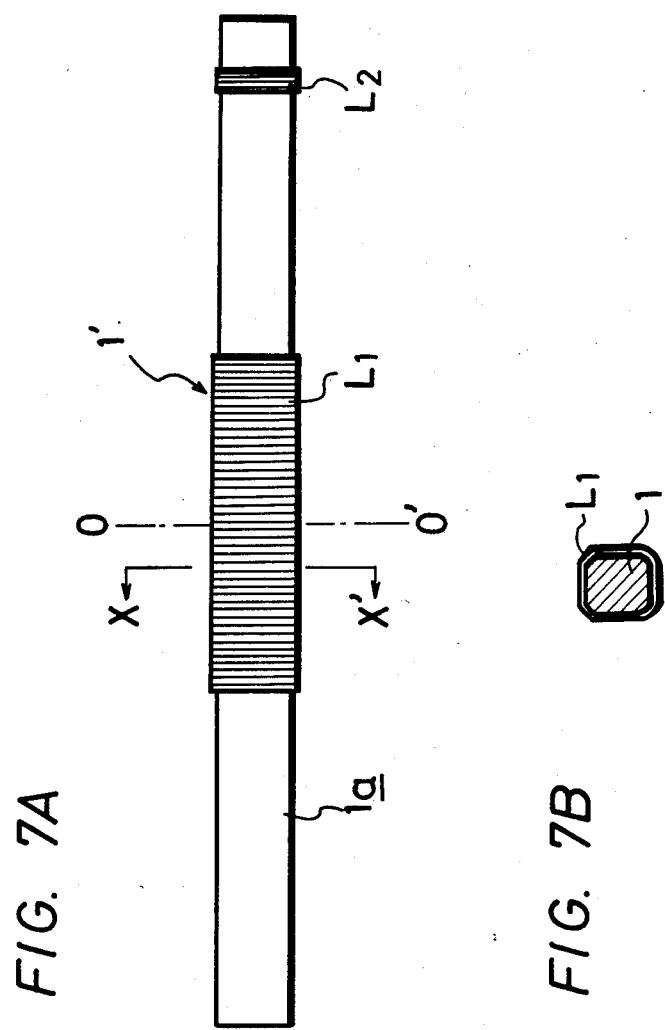

ANTENNA CIRCUIT

BACKGROUND OF THE INVENTION

1. Field of the Invention

This invention relates generally to antenna circuits, and more particularly is directed to an improved antenna circuit of the kind including a so-called bar-type antenna.

2. Description of the Prior Art

An antenna circuit is known in the prior art for use in an AM receiver and employs a so-called bar-type antenna constituted by a coil wound around a ferrite core. In such antenna circuit, a field effect transistor (FET) has its source connected to ground, and the coil of the bar-type antenna is connected between the gate of the FET and ground in parallel with a variable condenser. The drain of the FET is connected through a load to a voltage supply source and also to a mixer circuit which further receives a local oscillating signal to provide, as its output, an intermediate frequency signal. However, in such tuned antenna circuit, the inductance of the bar-type antenna has to be adjusted by varying the position of the coil relative to the ferrite core prior to being fixed to the latter. Therefore, the core cannot be directly wound around the ferrite core, but rather has to be wound on a bobbin which is at least initially movable along the core. Further, in order to increase the band width over which tuning can be effected, the Q factor has to be lowered which reduces the sensitivity of the antenna circuit. Further, in the described antenna circuit according to the prior art, phase rotation occurs with a change in the tuning frequency. Moreover, since the described antenna circuit employs a variable condenser for effecting tuning, any difference which is likely to occur between the characteristics of the variable condenser of the antenna circuit and the variable condenser of the local oscillator circuit results in a tracking error which lowers the sensitivity. In a synthesizer type receiver which uses a variable capacitor instead of the variable condenser in the local oscillator circuit, such use of a variable capacitor tends to increase the tracking error.

In order to avoid the above mentioned defects of the first described antenna circuit according to the prior art, it has been proposed to provide an antenna circuit of an aperiodic type which omits the previously described variable condenser. However, in practice, due to the stray capacity of the bar-type antenna and the circuit wiring, the input capacity of the FET and the inductance of the bar-type antenna, resonance occurs in the antenna circuit. In other words, the antenna circuit has a frequency characteristic with a peak at its resonance frequency. By reason of the foregoing, the sensitivity of the antenna circuit varies considerably in accordance with the receiving frequency. If signals, such as, a broadcast wave and the like exist in proximity to the resonance frequency, the multi-signal disturbance characteristic of the circuit is deteriorated. Further, since the gain of the antenna circuit is high at the peak portion of its frequency characteristic, there is a tendency for a parasitic oscillation to occur due to positive feedback.

For the foregoing reasons, in the known antenna circuit of the aperiodic type, it is necessary that the resonance frequency be provided outside the receiving band and that a resistor be provided to damp the peak of the frequency characteristic. However, the foregoing measures lead to other problems. For example, if the resonance frequency is moved outside the receiving band at the high frequency end of the latter, the inductance of the bar-type antenna has to be decreased and this, in turn, lowers the voltage induced in the coil of the bar-type antenna so that the sensitivity thereof is deteriorated. On the other hand, if the resonance frequency is shifted to the lower side of the receiving band, the bar-type antenna becomes capacitive within the receiving band so that the induced voltage is divided by the input capacity of the FET, which again deteriorates the sensitivity. Further, the resistor added to the circuit for damping the peak of the frequency characteristic is a source of noise so that the amount of damping that can be achieved by the added resistor is limited and, as a result thereof, the frequency characteristic cannot be sufficiently flattened.

OBJECTS AND SUMMARY OF THE INVENTION

Accordingly, it is an object of this invention to provide an antenna circuit that avoids the above-described problems associated with the prior art.

More specifically, it is an object of this invention to provide an antenna circuit with a flattened frequency characteristic.

Another object of this invention is to provide an antenna circuit with substantially uniform sensitivity throughout the receiving band.

Still another object of this invention is to provide an antenna circuit, as aforesaid, with an improved multi-signal disturbance characteristic.

Still another object of this invention is to provide an antenna circuit, as aforesaid, in which parasitic oscillation is suppressed by a negative feedback, thereby to stabilize the reception state.

A further object of this invention is to provide an antenna circuit having a bar-type antenna comprised of a coil wound on a ferrite core, and in which the number of windings of the coil can be freely increased for increasing the induced voltage therein and thereby improving sensitivity of the antenna.

A still further object of this invention is to provide an antenna circuit, as aforesaid, with an improved signal-to-noise (S/N) ratio.

Yet another object of this invention is to provide an antenna circuit, as aforesaid, in which the gain can be freely determined by varying the amount of negative feedback so that the freedom in designing the circuit can be increased.

In accordance with an aspect of this invention, an antenna circuit comprises a ferrite core, a field effect transistor having a grounded source, a gate and a drain, a main coil and a negative feedback coil wound around the core, and a load, with the main coil being connected to the field effect transistor so that a voltage induced in the main coil is applied across the gate and source of the field effect transistor to thereby form an aperiodic circuit, and with the opposite ends of the negative feedback coil being connected to the drain and load, respectively.

In a preferred embodiment of the invention, the load is constituted by a transformer, for example, an interstage transformer, which has a self-resonance providing a frequency characteristic with a first peak, while the negative feedback coil has a negative feedback frequency characteristic with a second peak, and the first and second peaks are arranged at frequencies displaced from each other to provide a substantially flat frequency characteristic curve for the circuit as a whole.

Further, in accordance with this invention, an antenna circuit, as aforesaid, is desirably provided with a resistor connected to the source of the field effect transistor for avoiding electrostatic breakdown of the latter.

The above, and other objects, features and advantages of this invention, will become apparent from the following detailed description of a preferred embodiment which is to be read in conjunction with the accompanying drawings wherein the same reference numerals are employed for identifying corresponding elements and components.

BRIEF DESCRIPTION OF THE DRAWINGS

FIGS. 7A and 7B are respectively a longitudinal elevational view of a bar-type antenna included in the antenna circuit of FIG. 4, and a sectional view thereof taken along the line X—X' on FIG. 7A.

DESCRIPTION OF THE PREFERRED EMBODIMENT

Figure 1:
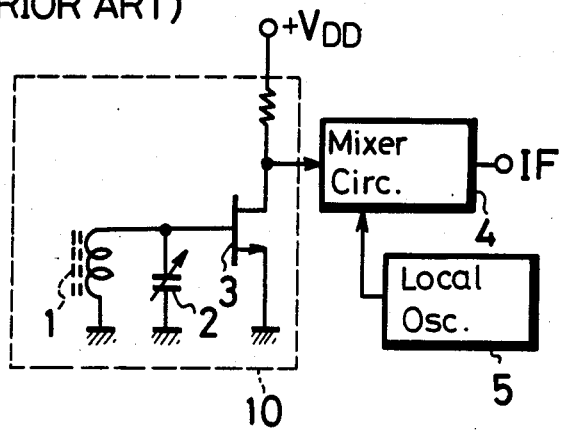
FIGS. 1 and 2 are circuit diagrams showing respective antenna circuits according to the prior art.

In order that the present invention and its advantages may be fully understood, an antenna circuit 10 used in an AM receiver according to the prior art and the problems associated therewith will first be described in detail with reference to FIG. 1. In this respect, it will be seen that antenna circuit 10 generally comprises a so-called bar-type antenna 1 having a ferrite core and a coil wound therearound, a variable condenser 2, and a field effect transistor (FET) 3. FET 3 has its source connected to ground, while the gate is connected to one end of the coil of bar-type antenna 1 which has its other end connected to ground. Condenser 2 is connected in parallel with the coil of antenna 1, and the drain of FET 3 is connected through a load (shown as a resistor) to a voltage supply source $+V_{DD}$, and also to an input of a mixer circuit 4. Mixer circuit 4 also receives a local oscillation signal from a local oscillator circuit 5 so as to provide an intermediate frequency signal IF.

As earlier noted, in the tuned-type antenna circuit 10, the inductance of bar-type antenna 1 has to be adjusted by displacement of the coil along the ferrite core. Therefore, the coil cannot be directly wound upon the ferrite core, but rather has to be wound on a bobbin which is, in turn, movable along the ferrite core of antenna 1. Further, in antenna circuit 10, the Q factor has to be decreased in order to widen the band width for tuning, and that tends to decrease the sensitivity of the antenna circuit. Furthermore, phase rotation occurs upon changing of the tuning frequency. Moreover, by reason of the presence of variable condenser 2 for effecting tuning, the inevitable difference between the characteristics of variable condenser 2 of antenna circuit 10 and a variable condenser included in local oscillator circuit 5 causes tracking error with the result that the sensitivity of antenna circuit 10 is lowered. If a synthesizer type receiver is used so that a variable capacitor can be substituted for the variable condenser of circuit 5, such variable capacitor tends only to increase the tracking error.

Figure 2:
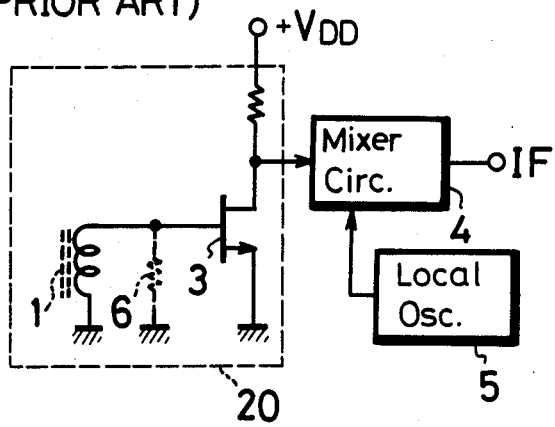
Figure 3:
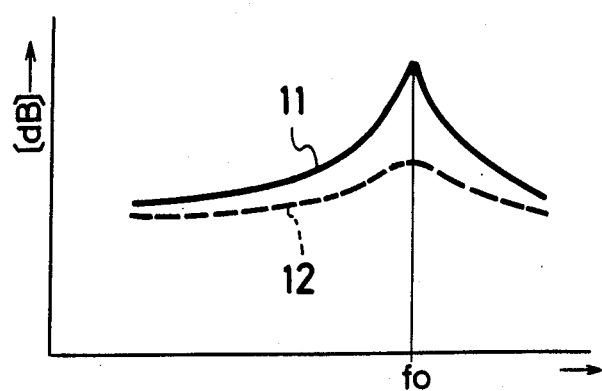
FIG. 3 is a graph showing the frequency characteristic of the antenna circuit of FIG. 2.

Referring now to FIG. 2, it will be seen that, in an antenna circuit 20 of aperiodic type proposed in the prior art for avoiding the problems associate with antenna circuit 10, variable condenser 2 of circuit 10 is omitted and the remaining elements of antenna circuit 20 which correspond to those described above with reference to FIG. 1 are identified by the same reference numerals and will not be further described. However, in practice, due to the stray capacity of bar-type antenna 1 and the wiring therefor, the input capacity $C_{iss}$ of FET 3 and the inductance of bar-type antenna 1, antenna circuit 20 is subject to resonance. Thus, as indicated by the curve 11 appearing in full lines on FIG. 3, the frequency characteristic of antenna circuit 20 has a substantial peak at its resonance frequency $f_o$. By reason of the peak in the frequency characteristic of antenna circuit 20 appearing at the resonance frequency $f_o$, the sensitivity of the antenna circuit is rapidly increased at or near the resonance frequency so that the sensitivity varies substantially with changes in the receiving frequency. Further, if signals, such as, a broadcast wave and the like, exist in proximity to the resonance frequency $f_o$, there is deterioration of the multi-signal disturbance characteristic. Moreover, since the gain of the antenna circuit 20 is high at the peak of its frequency characteristic, there is a tendency for parasitic oscillation to occur due to positive feedback.

In view of the above-mentioned problems associated with antenna circuit 20 of the aperiodic type, it is necessary to select the resonance frequency $f_o$ to be outside the receiving band. Further, as shown, a resistor 6 is connected to ground in parallel with the coil of bar-type antenna 1 for damping the peak of the frequency characteristic, as indicated by the curve shown in broken lines at 12 on FIG. 3. By way of example, if the receiving band is a middle waveband from 531 kHz to 1611 kHz, the resonance frequency $f_o$ is selected to be in the range from 1.8 MHz to 2.0 MHz, and the resistance value of resistor 6 is selected to be 560 k$\Omega$, thereby to damp the peak of the frequency characteristic. However, if this arrangement is employed with the resonance frequency $f_o$ being selected to be outside the receiving band, for example, at the higher side thereof, the inductance of bar-type antenna 1 is decreased and, as a result thereof, the induced voltage of the bar-type antenna is lowered so as to deteriorate the sensitivity of the antenna circuit. On the other hand, if the resonance frequency $f_o$ is moved to the lower side of the receiving band, bar-type antenna becomes capacitive in the receiving band so that the voltage induced in the coil of antenna 1 is divided by the input capacity $C_{iss}$ of FET 3 for again deteriorating the sensitivity of the circuit. Furthermore, damping resistor 6 is a source of noise and, if the amount of damping is kept low in order to minimize the noise, the desired flatness of the frequency characteristic cannot be achieved.

Figure 4:
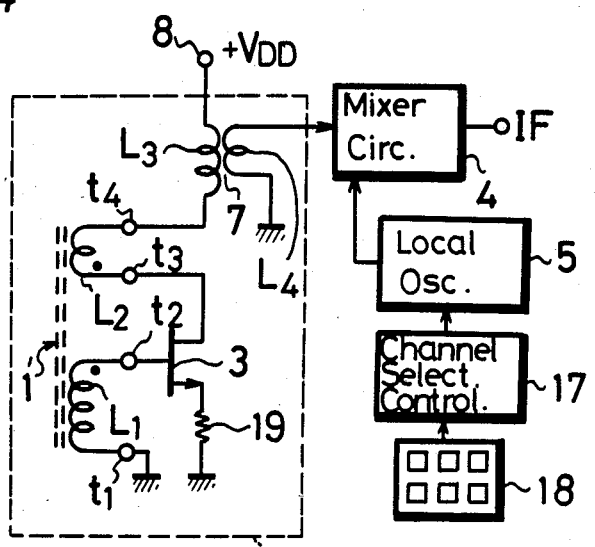
FIG. 4 is a circuit diagram showing an antenna circuit according to an embodiment of the present invention.

Referring now to FIG. 4, in which the parts corresponding to those previously described are identified by the same reference numerals, it will be seen that, in an antenna circuit 30 according to an embodiment of the present invention, the bar-type antenna 1' includes a ferrite core 1a (FIG. 7A) on which a main coil $L_1$ and a negative feedback coil $L_2$ are both wound. A hot side end $t_2$ of main coil $L_1$ is connected to the gate of FET 3, while the cold side end $t_1$ of main coil $L_1$ and the source of FET 3 are connected to ground. In the illustrated embodiment, the hot side end $t_2$ of main coil $L_1$ is the end at which the winding of that coil on core $1a$ is started.

As shown on FIG. 4, one end $t_3$ of negative feedback coil $L_2$ is connected to the drain of FET 3, and the winding of negative feedback coil $L_2$ on ferrite core $1a$ begins at the end $t_3$ of that coil. The other end $t_4$ of coil $L_2$ is connected through a load to a voltage supply source terminal 8. In the embodiment shown on FIG. 4, the load through which negative feedback coil $L_2$ is connected to the voltage supply source is constituted by an input coil $L_3$ of an interstage transformer 7 which has its output coil $L_4$ connected to mixer circuit 4.

Further, in the embodiment of the invention shown on FIG. 4, the local oscillator circuit 5 includes a phase locked loop (not shown) so as to provide a channel selector of the synthesizer type. A channel-selection control device 17, which may be constituted by a single-chip type, 4-bit micro-computer produced by Nippon Electric Company, Ltd., under the designation $\mu$PD-7503, is connected with local oscillator circuit 5 and is operated in response to actuation of a keyboard 18.

In the antenna circuit 30 in accordance with this invention, the voltage induced in main coil $L_1$ is amplified by FET 3 and converted to a drain current of the FET which flows in negative feedback coil $L_2$ and in input coil $L_3$ of transformer 7, whereby the voltage of the received signal is supplied to mixer circuit 4 and converted, in the latter, to an intermediate frequency signal IF. Since the drain current of FET 3 flows in coil $L_2$, a negative feedback is applied to the input side of FET 3, and the amount of such negative feedback can be freely determined by suitably selecting the coupling coefficient or winding ratio of coils $L_1$ and $L_2$. Further, since the negative feedback is applied in respect to the current flowing in coil $L_2$, no phase displacement will occur.

Figure 5:
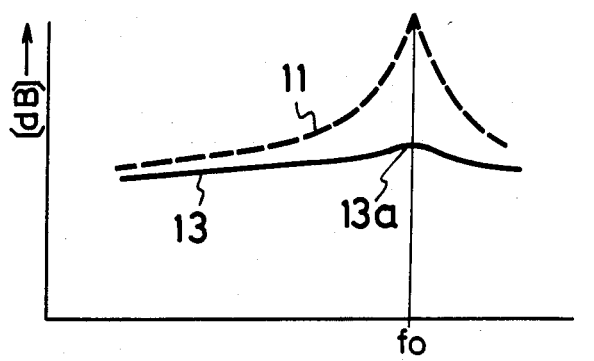
FIGS. 5 and 6 are graphs showing frequency characteristics of the antenna circuit of FIG. 4.

Accordingly, even if the frequency characteristic of antenna circuit 30 in the absence of the negative feedback has a peak occurring at the resonance frequency $f_o$, as represented by the curve 11 shown in dotted lines on FIG. 5, the application of the described negative feedback modifies the frequency characteristic to one that is substantially flat, as indicated by the curve 13 in solid lines on FIG. 5, and which has only a relatively small peak or rise 13a at the resonance frequency. By reason of the foregoing, the antenna circuit 30 according to this invention has a substantially uniform sensitivity over the entire receiving band, and the multi-signal disturbance characteristic of the antenna circuit can be improved. Further, since the negative feedback provided in antenna circuit 30 substantially suppresses parasitic oscillation, stable reception is ensured. Moreover, even when the resonance frequency $f_o$ of the antenna circuit according to this invention is located within the receiving band, the substantially flat frequency characteristic that is obtained makes it possible to freely select the number of windings in main coil $L_1$. Thus, a large number of windings can be provided in main coil $L_1$ for increasing the induced voltage therein and thereby improving the sensitivity of the antenna circuit.

Generally, FETs having a large mutual conductance gm are characterized by a small noise factor NF and a large input capacity $C_{iss}$. However, since the antenna circuit according to the present invention is not troubled by the presence of its resonance frequency within the receiving band, the FET 3 may be one which has a large mutual conductance gm and a correspondingly small noise factor NF for improving the signal-to-noise (S/N) ratio. Further, since the damping resistor 6 of the prior art antenna circuit 20 shown in FIG. 2 is omitted from the antenna circuit 30 embodying the present invention, the S/N ratio is further improved by the absence of this noise source. Moreover, in the antenna circuit embodying this invention, the gain can be freely determined by controlling the amount of negative feedback with the result that substantial freedom is afforded in designing the antenna circuit.

Figure 6:
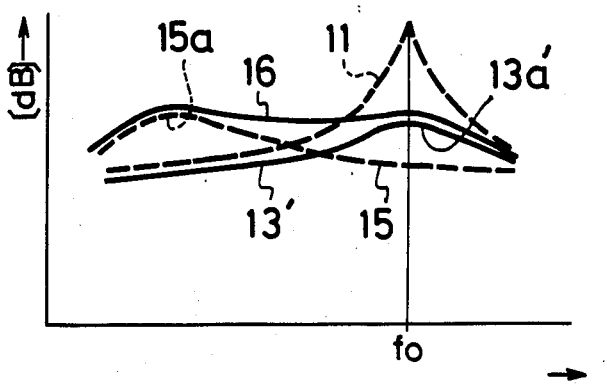

If the input coil $L_3$ of transformer 7 is used as the load in antenna circuit 30, the peak 13a appearing on the frequency characteristic curve 13 of antenna circuit 30 at resonance frequency $f_o$, and which is made very small by the negative feedback, may be amplified by transformer 7 so as to appear as a relatively more conspicuous peak, as at 13'a on FIG. 6. Therefore, in accordance with this invention, the frequency characteristic curve 15 of transformer 7 which has a peak portion 15a due to the stray capacity and self-resonance of the transformer is selected to dispose the peak portion 15a at the low frequency side of the receiving band. If the peak 15a due to self-resonance of transformer 7 is relatively large, the amount of negative feedback may be reduced by decreasing the number of windings of negative feedback coil $L_2$ so that the level of the peak 15a of frequency characteristic curve 15 of transformer 7 is generally matched by the level of peak 13'a of the frequency characteristic curve 13', with the result that the overall frequency characteristic can be represented by a substantially flat frequency characteristic curve of relatively high level, at least between the frequencies corresponding to the peaks 15a and 13'a. When the foregoing relationship is realized, the gain of the antenna circuit can be substantially increased.

Referring again to FIG. 4, it will be seen that, in the illustrated antenna circuit 30 according to this invention, a resistor 19, for example, having a resistance value of 10 to 20$\Omega$, is connected to the source of FET 3 for protecting the latter from damage due to electrostatic breakdown.

Referring now to FIGS. 7A and 7B, it is noted that main coil $L_1$ is desirably formed by directly winding and binding around core 1 a suitable number of turns, for example, 120 turns, of a conductor constituted by 10 wires each having a diameter of 0.07 mm, and which are bundled and twisted together and covered with an insulating layer on the outer peripheral surface. The negative feedback coil $L_2$ is formed by similarly directly winding 10 turns around ferrite core 1 of a conductor which is constituted by bundling and twisting 4 wires similar to the wires employed in forming coil $L_1$. The negative feedback coil $L_2$ is wound on core 1 at a predetermined distance from main coil $L_1$ which, as shown on FIG. 7A, is substantially centered in respect to the middle of core 1 identified by the line o—o'. When the main coil $L_1$ is thus centered in respect to the length of core 1, the voltage induced in main coil $L_1$ is maximized and thereby provides excellent sensitivity for the antenna circuit.

Although the antenna circuit 30 according to this invention has been described above in association with a local oscillator circuit 5 of the PLL synthesizer type, it will be understood that the local oscillator circuit 5 may employ a variable condenser for effecting the tuning and, in that case, the channel-selection control device 17 and the keyboard 18 of FIG. 4 can be omitted.

Further, a resistor (not shown) can be used as the load in place of the input coil or winding $L_3$ of transformer 7.

Having described in detail an illustrative embodiment of the invention and a few modifications thereof, it is to be understood that the invention is not limited to the foregoing, and that various changes and further modifications may be effected therein by one skilled in the art without departing from the scope or spirit of the invention as defined in the appended claims.

What is claimed is:

1. An antenna circuit comprising:
   a ferrite core, a field effect transistor having a grounded source, a gate and a drain, a main coil and a negative feedback coil wound around said core, and a load; and in which said main coil has a substantially greater number of turns than said negative feedback coil and is connected to said field effect transistor so that a voltage induced in said main coil is applied across said gate and source to thereby form an aperiodic circuit by which said voltage is amplified by said field effect transistor and converted to a drain current of the latter which flows in said negative feedback coil having its opposite ends connected to said drain and said load, respectively.

2. An antenna circuit according to claim 1; in which said ferrite core is of elongated bar-shaped configuration, and said main coil is centered in respect to said ferrite core in the direction along the length of the latter.

3. An antenna circuit according to claim 2; in which said negative feedback coil is spaced from said main coil along said ferrite core.

4. An antenna circuit according to claim 1; in which said source of the field effect transistor is resistively coupled to ground.

5. An antenna circuit comprising a ferrite core, a field effect transistor having a grounded source, a gate and a drain, a main coil and a negative feedback coil wound around said core, and a load; said main coil being connected to said field effect transistor so that a voltage induced in said main coil is applied across said gate and source to thereby form an aperiodic circuit, and the opposite ends of said negative feedback coil being connected to said drain and said load, respectively; and in which said load includes a transformer, said transformer has self-resonance providing a frequency characteristic with a first peak at a first predetermined frequency, said negative feedback coil has a negative feedback frequency characteristic with a second peak at a second predetermined frequency, and said first and second frequencies are displaced from each other to provide a substantially flat frequency characteristic curve for the circuit as a whole.

6. An antenna circuit comprising a ferrite core, a field effect transistor having a grounded source, a gate and a drain, a main coil and a negative feedback coil wound around said core, a load, said main coil being connected to said field effect transistor so that a voltage induced in said main coil is applied across said gate and source to thereby form an aperiodic circuit, the opposite ends of said negative feedback coil being connected to said drain and said load, respectively; said load including an interstage transformer having an input winding connected between said negative feedback coil and a voltage supply source, and an output winding, mixer means connected to said output winding, and local oscillator means applying a local oscillation signal to said mixer means so that an intermediate frequency signal is derived from said mixer means.

* * * * *